United States Patent
Ledoux

(10) Patent No.: US 6,451,208 B1
(45) Date of Patent: Sep. 17, 2002

(54) DEVICE FOR MOLECULAR POLARIZATION IN WATER

(76) Inventor: Denis-Michel Ledoux, 62 Fontenay, Lorraine, Quebec (CA), J6Z 1R7

( * ) Notice: Subject to any disclaimer, the term of this patent is extended or adjusted under 35 U.S.C. 154(b) by 0 days.

(21) Appl. No.: 09/647,307

(22) PCT Filed: Mar. 30, 1999

(86) PCT No.: PCT/CA99/00274

§ 371 (c)(1),
(2), (4) Date: Sep. 26, 2000

(87) PCT Pub. No.: WO99/50186

PCT Pub. Date: Oct. 7, 1999

Related U.S. Application Data

(60) Provisional application No. 60/080,207, filed on Mar. 31, 1998.

(51) Int. Cl.[7] ................................................. C02F 1/48
(52) U.S. Cl. .................. 210/222; 422/186.04; 204/660; 204/664
(58) Field of Search ................................. 204/660, 557, 204/666, 664; 210/243, 222, 223, 695, 748; 422/186.04

(56) References Cited

U.S. PATENT DOCUMENTS

| | | | | |
|---|---|---|---|---|
| 3,669,274 A | * | 6/1972 | Happ et al. | |
| 3,727,761 A | * | 4/1973 | Aspinwall et al. | |
| 4,151,090 A | * | 4/1979 | Fava | |
| 4,216,092 A | * | 8/1980 | Shalhoob et al. | |
| 4,443,320 A | * | 4/1984 | King | |
| 4,744,910 A | * | 5/1988 | Bossard | |
| 4,879,045 A | * | 11/1989 | Eggerichs | |

* cited by examiner

Primary Examiner—Joseph W. Drodge
Assistant Examiner—Terry K. Cecil
(74) Attorney, Agent, or Firm—Eric Fincham

(57) ABSTRACT

A device for applying electrostatic and magnetic fields to a fluid includes an outer conduit 48 and an inner conduit 50 forming a fluid passageway 86 therebetween. The inner conduit is connected to a DC power source and the outer conduit along with electrode needles 84 in electrical communication therewith are connected to ground. A baffle 82 is positioned within the passageway to impart a spiral motion to the fluid flowing therein.

9 Claims, 6 Drawing Sheets

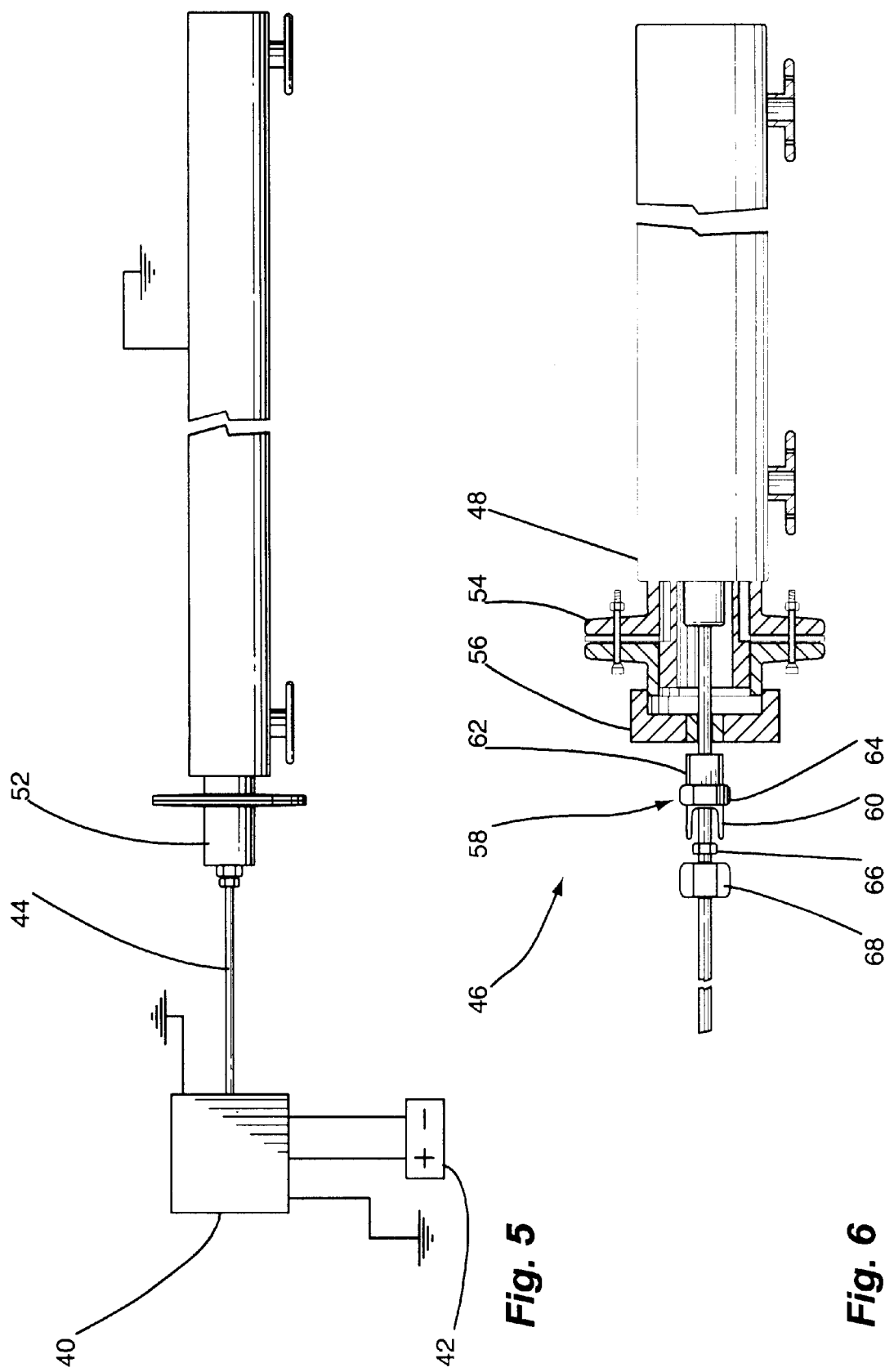

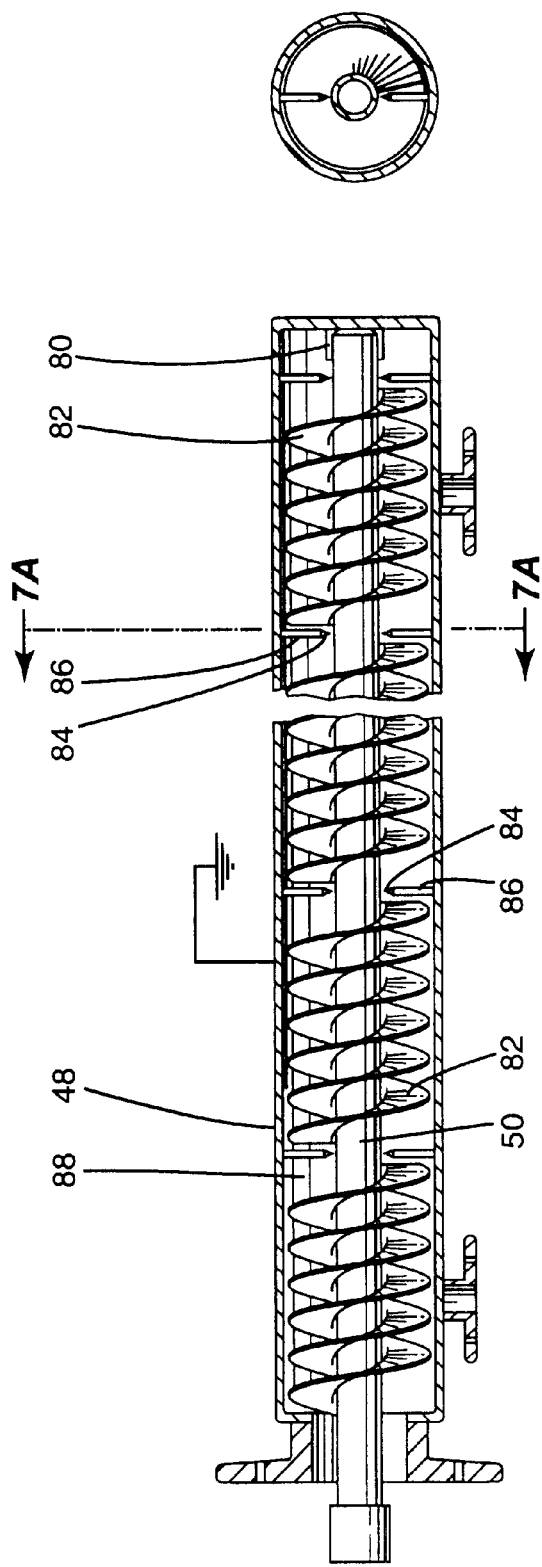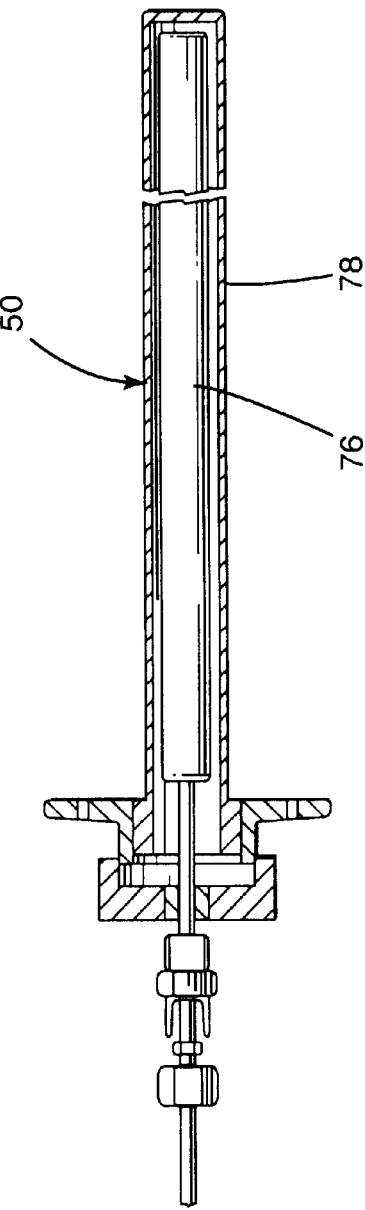
Fig. 7A
Fig. 7
Fig. 8

DEVICE FOR MOLECULAR POLARIZATION IN WATER

This application claims the benefit of U.S. Provisional Application 60/080,207, filed Mar. 31, 1998.

The present invention relates to the treatment of fluids, and more particularly relates to devices and methods for the treatment of fluids containing contaminants therein and in particular, for the treatment of water.

BACKGROUND OF THE INVENTION

The treatment of a fluid, and particularly water, with a field is well known in the art. Treatment of water is typically carried out to reduce some of the problems associated with scaling and corrosion of the equipment using the water. In particular, the use of high temperature water in boilers and the like has always caused significant problems and there have been many proposals in the art for treating the water, including the use of chemicals, in order to reduce the problems of scaling and corrosion.

It is known in the art to treat boiler water with either an electrostatic or magnetic field and such devices are commercially available.

The problem of scaling occurs wherein the suspended solids bind together and collect on heat exchange equipment. The degree of the problem will depend on the pH of the water, the operating conditions of the circuit, the source of the water, etc.

As aforementioned, it has been proposed in the art to use high potential electrostatic fields to treat the water such that the particles in suspension become charged and can be attracted/repelled as desired. The same principle is used in other industrial processes such as paint spraying and photocopiers.

The use of magnetic fields to treat water has also been proposed in the art although such devices have not received a large acceptance in the industry. Rather, treatment of the water by chemicals is the norm in many industrial plants.

One particular field wherein a problem exists is in the separation of pollutants by use of a membrane, the principle being that of reverse osmosis. Many such systems are in commercial use in order to purify water. However, one problem which is encountered in such systems is the relatively short life of the membrane due to clogging and/or physical damage by the contaminants.

It is known from U.S. Pat. No. 4,443,320 to provide electrodes which extend into a fluid carrying conduit.

SUMMARY OF THE INVENTION

It is an object of the present invention to provide an improved reverse osmosis system wherein membrane life may be enhanced.

It is a further object of the present invention to provide a novel; electrostatic device for the treatment of water.

It is a further object of the present invention to provide a magnetic device for the treatment of a fluid.

It is a still further object of the present invention to provide improvements in processes and apparatuses which use fields to treat a fluid.

According to one aspect of the present invention of in a device for treating a fluid comprising an outer elongated conduit, an inner coaxial conduit, a fluid passageway being defined intermediate the outer elongated conduit and the inner coaxial conduit, means for creating an electrostatic field within the passageway, there is provided the improvement comprising baffle means mounted in the fluid passageway; a plurality of electrode needles in electrical communication with the outer conduit, the electrode needles extending inwardly towards the inner coaxial conduit, and a power source operatively connected to the outer conduit and the needles to create an intense electric discharge similar to a corona effect. Alternately, the outer conduit and electrode needles are connected to ground and a DC power source is connected to the inner conduit.

In a further aspect of the present invention, there is provided a method for treating fluid comprising the steps of supplying the aforementioned fluid treating device and passing the fluid through the fluid passageway and applying a DC voltage to the needles to create an intense electric discharge similar to a corona effect.

In a still further aspect of the present invention, there is provided a method for prolonging the life of a membrane in a reverse osmosis system wherein a fluid is passed over the membrane, the method comprising the step of passing the fluid through a field to create a positive charge on any particulate matter in the fluid.

Various types of closed (or partially closed) loop systems wherein scaling and corrosion causes problems are known. One may include heating and air conditioning equipment such as hot water or steam boilers, cooling water towers, heat pumps, refrigeration equipment, distillers, etc. The use of a polarization system influences the contaminants within the fluid With the present invention, one is able to polarize die contaminant molecules in a manner which changes their ability to affect the system. In particular, these contaminant particles are kept in an ionic form for reasons which are discussed hereinbelow.

The closed loop system may be any conventional and would normally include, in the case of hot water or steam, a boiler, associated conduits for recirculating the fluid, a pump and other conventional components including valves and the like. According to the present invention, there is provided a polarization system to inhibit the deposition of contaminants.

In a purification system using membranes such as in reverse osmosis, the fluid (hereinafter referred to as water) passing over the surface of the polymer membrane creates a situation wherein the membrane surface becomes positively charged with transfer of electrons to the water which thereby becomes negatively charged and a conductor. Neutral molecules such as calcium carbonate tend to be destabilized by the induction of the negative charges and will generally be attracted to the membrane surface and/or any other positively charged surface. In this state, the calcium carbonate is generally in the form of small needles which can have a deleterious effect on the surface of the membrane. As time goes along, the membrane becomes clogged and damage occurs to the surface.

With the use of a polarization device, the device, in one embodiment, provides a positive charge to the water. Molecules of, for example, calcium carbonate which are normally neutral, are reorganizing their electro-chemical bonds. The small sharp needles of calcium carbonate tend to gather together in small porous balls which carry a positive charge. These small porous balls, when they reach the surface of the membrane, absorb and neutralize negative ions and then there is a natural ionic repulsion between the limestone balls and the surface. A similar process may be carried out with other contaminants including bio-contaminants.

The magnetic reactor is most suitable for treating relatively small volumes of water as the cost of magnets can be substantial. Preferably, such a device would be used only for treating volumes up to approximately 80 litres per minute.

The outer conduit may be made of any suitable material including stainless steel or plastic, the material being capable of withstanding the corrosion, pressure and temperatures required.

The magnetic portion of the device may be suitably encased within the inner conduit which is preferably of a stainless steel having a minimum thickness. The magnets are preferably of the AlNiCo type. The arrangement is such that the inner conduit represents approximately half of the total diameter of the outer conduit. Although different sizing may be used, generally magnets may be approximately 2–3 centimetres in diameter and 2–3 centimetres long. The magnets are arranged such that similar poles face each other and thus have a repelling force towards each other.

As above mentioned, there are provided baffle means which are designed to impart a spiral motion to the fluid being passed therethrough. Preferably, the baffles are such that the water will pass through 360 degrees in 1½ times the magnet length. As the water passes through the passageway, there is set up an electromagnetic force in the fluid. This in turn will charge the contaminated molecules. These contaminants, which may be for example, calcium carbonate, then tend to form small porous balls which carry a positive charge.

In the electrostatic field embodiment, there is provided a device, which in addition to creating an electrostatic field, combines the same with electrodes protruding into the passageway to provide a localized energy content.

The electrostatic generator may operate at between –12 kV DC to –50 kV DC with a current of between 250 mA to 10 mA. It is also possible to use positive voltage if circumstances require the same.

According to the present invention, one can use different types of polarization devices in different water treatment apparatuses such as reverse osmosis systems and closed loop boiler systems.

In the instant specification, reference has been made to water as being the fluid most commonly treated. It will be understood that other fluids may likewise be treated. Such fluids can include, for example, liquids and vapours.

It will also be understood that the polarization devices of the present invention may be used either singly or in combination if so desired.

BRIEF DESCRIPTION OF THE DRAWINGS

Having thus generally described the invention, reference will be made to the accompanying drawings illustrating embodiments thereof, in which:

FIG. 5 is a side elevational view of a further embodiment of a polarization device;

FIG. 6 is a side elevational view, partially in section, of a portion of the polarization device of FIG. 5;

FIG. 7 is a side elevational view, partially in cutaway, of the polarization device of FIG. 5;

FIG. 7A is a cross sectional view of FIG. 7;

FIG. 8 is a side sectional view of the inner conduit portion of the polarization device of FIG. 5.

DESCRIPTION OF THE PREFERRED EMBODIMENTS

Figure 1:
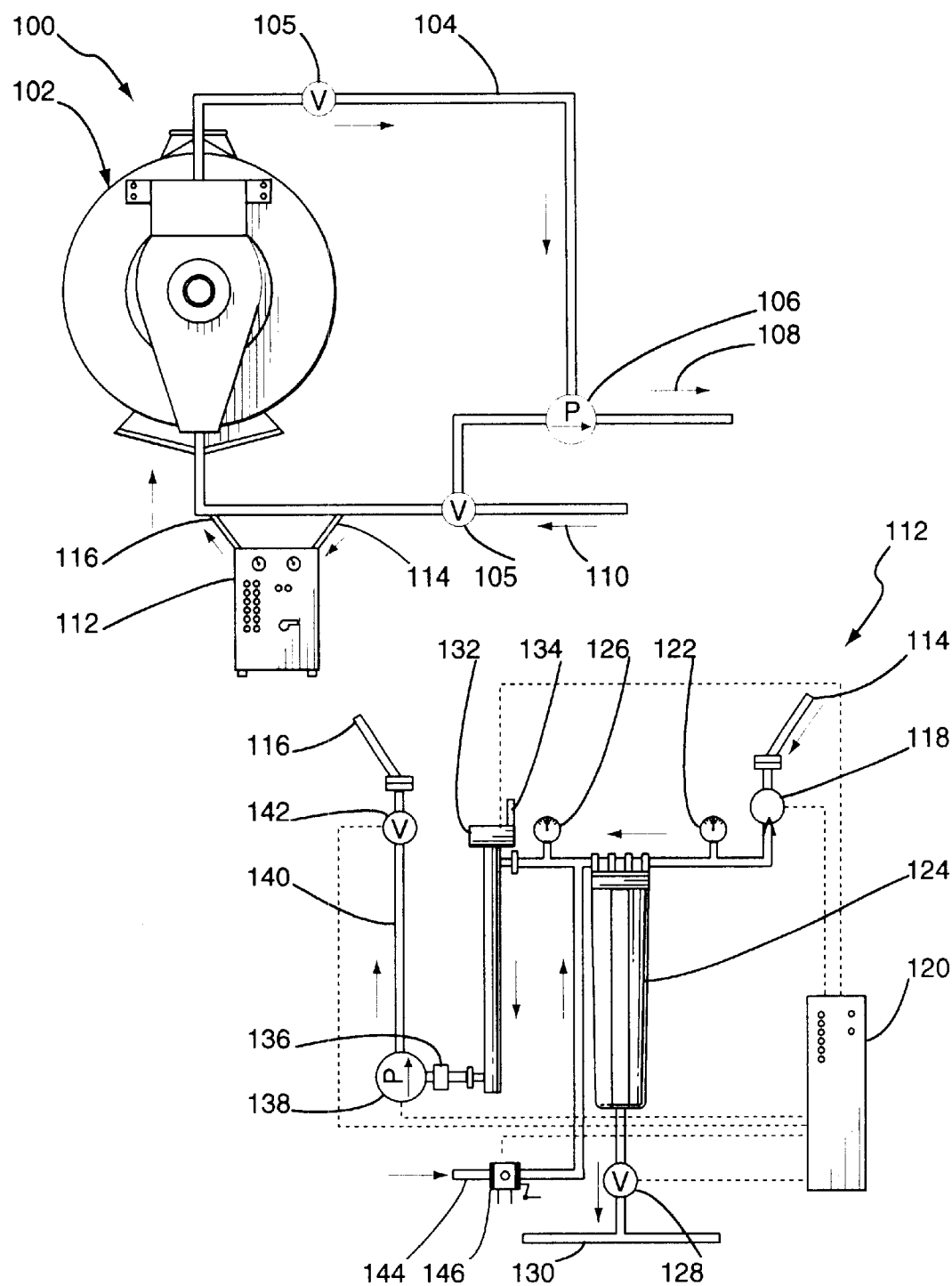
FIG. 1 is a schematic view illustrating a closed loop boiler system and associated polarization system.

FIG. 1 illustrates a closed loop boiler system generally designated by reference numeral 100. Closed loop boiler system 100 includes a boiler 102 along with conduits 104 for circulation of the water. A circulation pump 106 pumps the water through conduits 104 which are provided with valves 105 in a conventional manner. Water is pumped through a conduit for its end use as indicated by arrow 108 and returned as indicated by arrow 110.

An ionic polarization system 112 is mounted in-line and includes an inlet conduit 114 and an outlet conduit 116.

Ionic polarization system 112, as shown in FIG. 1, includes a high temperature solenoid valve 118 mounted on inlet conduit 114. An automatic circuit 120 is operatively connected to high temperature solenoid valve 118 and which solenoid valve will be closed during backwash of the system as will be discussed in greater detail hereinbelow.

A pressure gauge 122 is mounted on the conduit prior to the inlet to a filter 124. Filter 124 is preferably of the washable type and used to eliminate sedimentary aggregates. Filter 124 preferably filters down to one micron.

A second pressure gauge 126 is mounted at the outlet from filter 124. At the bottom of the filter 124, there is provided a motorized ball valve 128 to permit discharge, after backwash, to sewage discharge line 130.

A polarization device 132 is mounted in-line and will be discussed in greater detail hereinbelow. Polarization device 132 is operatively connected to automation circuit 120 and is provided with a visual indicating device 134 which may report any short circuit or other problem associated therewith.

After polarization device 132, there is provided an inverted pressure switch 134 to protect a pump 138 mounted in-line from sudden pressure declines. Pump 138 is utilized to draw a portion of the water from the boiler circuit to treat a portion thereof The pump may be adjusted according to the boiler pressure and the natural restriction which will be created by the polarization system.

After pump 138, there is provided a further solenoid valve 142 following which the water is passed through outlet conduit 116.

The system may include a water line 144 fed to solenoid 146 which is also operatively connected to automation circuit 120, for purposes of periodically back washing filter 124.

Figure 2:
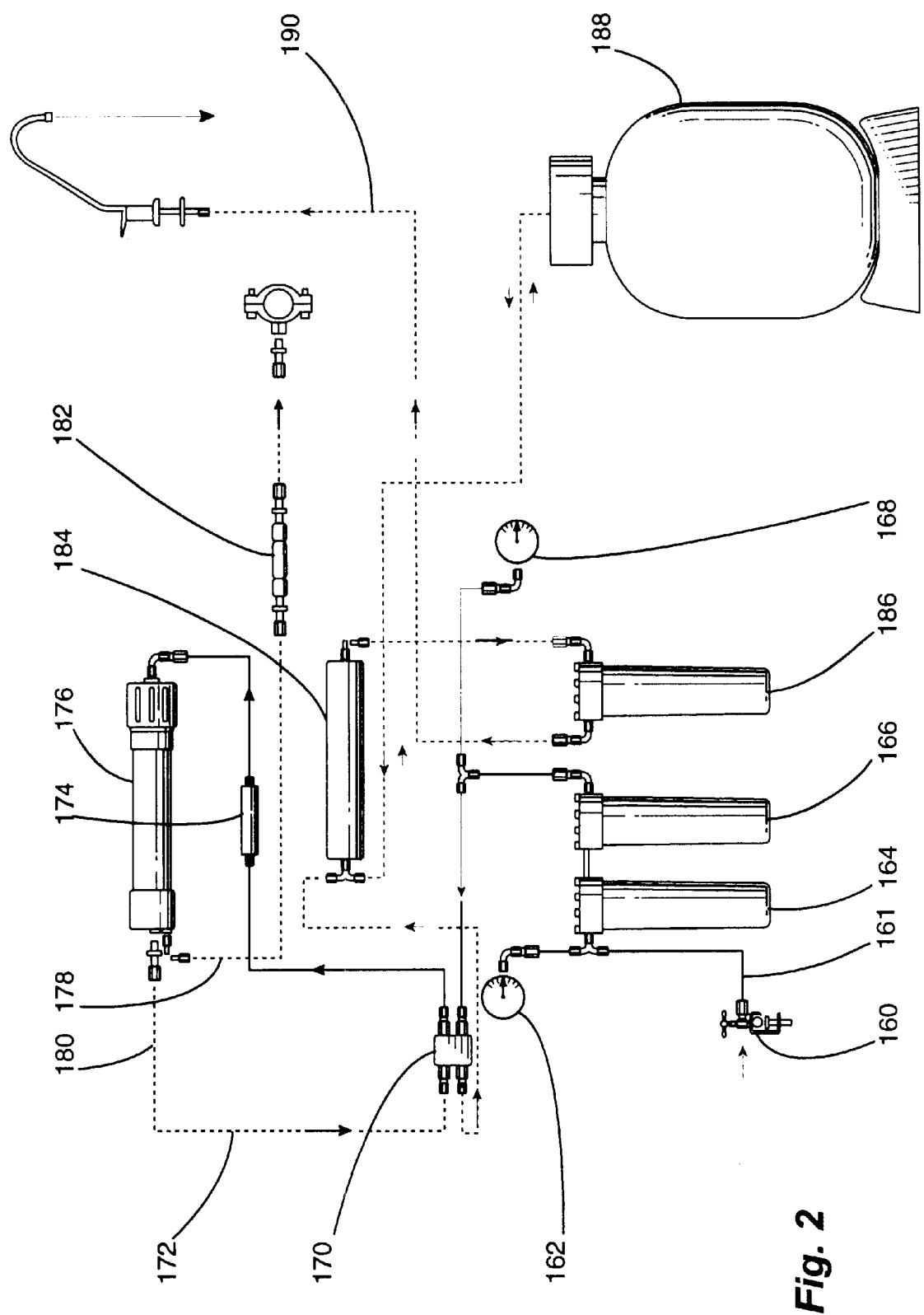
FIG. 2 schematically illustrates a reverse osmosis system including a polarization device.

Turning to FIG. 2, there is illustrated a reverse osmosis system. In this system, a valve 160 is mounted on a water input line 161. A first pressure gauge 162 is mounted thereon following which the water will pass sequentially through filters 164 and 166.

Filter 164 is preferably of the type formed of micro fibres of polypropylene on a matrix. These filters provide extremely good filtering properties and are manufactured to have a very precise control over the size of the particle filtered. Filter 166 is preferably an active carbon filter which removes a large number of pollutants and thereby protect the reverse osmosis membrane from contact with some of these deleterious pollutants particularly those such as chlorine.

At the exit from carbon filter 166, there is provided a pressure gauge 168 which, in combination with pressure gauge 162, will indicate any pressure drop and thus possible clogging of filters 164 and 166. A balancing valve 170 is provided on the output line and the water is then fed through a conduit 172 to a polarization device 174. After passing through a polarization device 174, it is delivered to a reverse osmosis device 176.

Polarization device 174, as discussed hereinbelow, polarizes pollutants such as limestone molecules and stops them from causing any damage to the membrane by creating a natural ionic repulsion of each molecule or particle.

Reverse osmosis system 176 preferably includes a membrane of a type which can eliminate more than 96% of all dissolved solvents. It is preferably of the TFC type which are not attacked by bacteria, viruses and parasites.

After the reverse osmosis system 176, there is provided a waste water discharge conduit 178 and a pure water discharge conduit 180. Mounted on waste water conduit 178 is a restrictor 182 to maintain an adequate osmotic pressure in reverse osmosis system 176.

Pure water conduit 180 passes to balancing valve 170 before delivering the water to a final carbon filter to soften the water (if required). Subsequently, a further filtering may be provided by filter 186. This filter may use a hydrophilic membrane of polyethersulfone to guarantee a water without the biological pollutants such as bacteria, mould, viruses and the like.

The system includes a pressure tank 188 as is known in the art before leading to a discharge conduit 190.

Figures 3, 4:
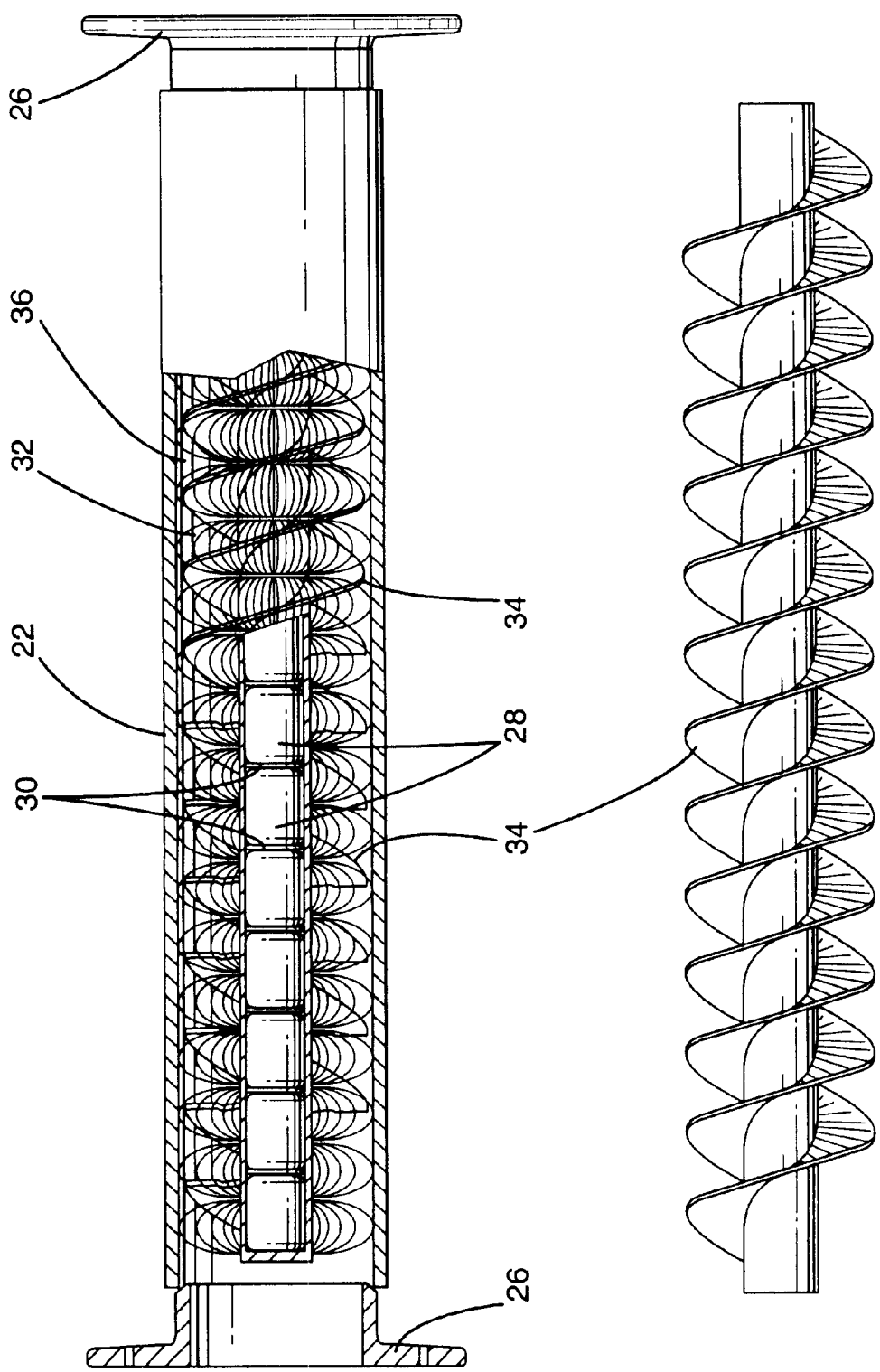
FIG. 3 is a cross sectional view illustrating a portion of a first polarization device.
FIG. 4 is a side elevational view showing the inner conduit and associated baffles of the device of FIG. 3.

As shown in FIGS. 3 and 4, there is provided a polarization device which includes an outer elongated conduit 22 having at either end flanges 26 for connection within the water treatment system.

Mounted interiorly of outer elongated conduit 22 is an inner coaxial conduit generally designated by reference numeral 24. Between outer conduit 22 and inner coaxial conduit 24 there is defined a fluid passageway 36.

Mounted within inner conduit 24 are a plurality of magnets. Preferably, the magnets are sized to be approximately 50% of the total diameter of outer conduit 22. Magnets 28 are preferably of the AlNiCo type. It will be noted that magnets 28 have As shown in FIG. 3, lines of flux 32 are created within fluid passageway 36. Baffle means comprising baffles 34 are mounted on the exterior surface of inner conduit 24 in a spiral like configuration and thereby restrict the flow of fluid through fluid passageway 36. Naturally, baffles 34 could be mounted on the interior wall of outer conduit 22 or could constitute a separate component.

In a preferred embodiment, the arrangement of baffles 34 is such that each baffle is separated from the other by approximately 1½ times the length of the individual magnets 28.

The above arrangement is such that the fluid, which may be water, flowing through the passageway 36, is in relative movement to the magnetic field. In the instant case, the central energy body is magnetic and multi polar while not moving. The fluid, preferably water, moves from one field to another and therefore there is set up an electromagnetic force. It will be noted that the magnets, in the preferred embodiment, are arranged such that a north pole is provided at the exit to thereby induce a positive charge to the fluid.

A further embodiment of a polarization device is illustrated in FIGS. 5 to 8 and reference will now be made thereto.

In this embodiment, there is provided a high voltage power supply 40 as well as a low voltage power supply 42 to supply high voltage supply 40, if required. Typically, high voltage power supply 40 may be able to supply power at −50 KV to +50 KV dc. Thus, the power supply can be used to generate positive ions or negative ions as required.

Electrical wires 44 operatively connect the power supply 40 to a polarization device generally designated by reference numeral 46.

Polarization device 46 has at electrically grounded outer elongated conduit 48 and a coaxial inner conduit 50. For connection purposes, there is provided a moveable connecting member which is generally designated by reference numeral 52 and which removable connecting member 52 allows access to the interior of outer elongated conduit 48 as required.

Outer removable member 52 includes a flange 54 for connection to outer elongated conduit 48 and there is provided an end cap. 56. A connector generally designated by reference numeral 58 includes a first male threaded portion 60 and a second male threaded portion 62 intermediate of which there is a nut portion 64. To provide proper sealing, there is provided a sleeve 66 held in position by nut 68 screw threadably engageable with male threaded portion 60. In turn, male threaded portion 62 is engageable with a threaded portion on end cap 56. Elongated conduit 48 is connected to removable connecting member 52 by means of flange 72 and bolt 74 which engage flanges 72 and 54.

Inner coaxial conduit 50 is formed of a metallic electrode 76 which may comprise, for example, a solid metallic bar of a material such as copper. Surrounding electrode 76 is an outer dielectric lining 78 which may be made of a suitable material such a PTFE. At the distal end of inner conduit 50, there is provided a conduit support member 80.

Mounted within passageway 88 are baffles 82 which again have a spiral configuration. Baffles 82 are used to slow the flow of the fluid to the reactor. The gap between the baffles and the interior conduit is preferably small—in the order of 40 to 80 mm and more preferably, between 50 and 70 mm.

Supports 86 are mounted within outer conduit 48 and extend towards inner conduit 50. Supports 86 have mounted at the end thereof electrode discharge needles 84. Needles 84 are preferably situated so as to be between 30 and 50 mm from inner conduit 50. Needles 84 create an intense electric discharge similar to the known Corona Effect.

Figure 9:
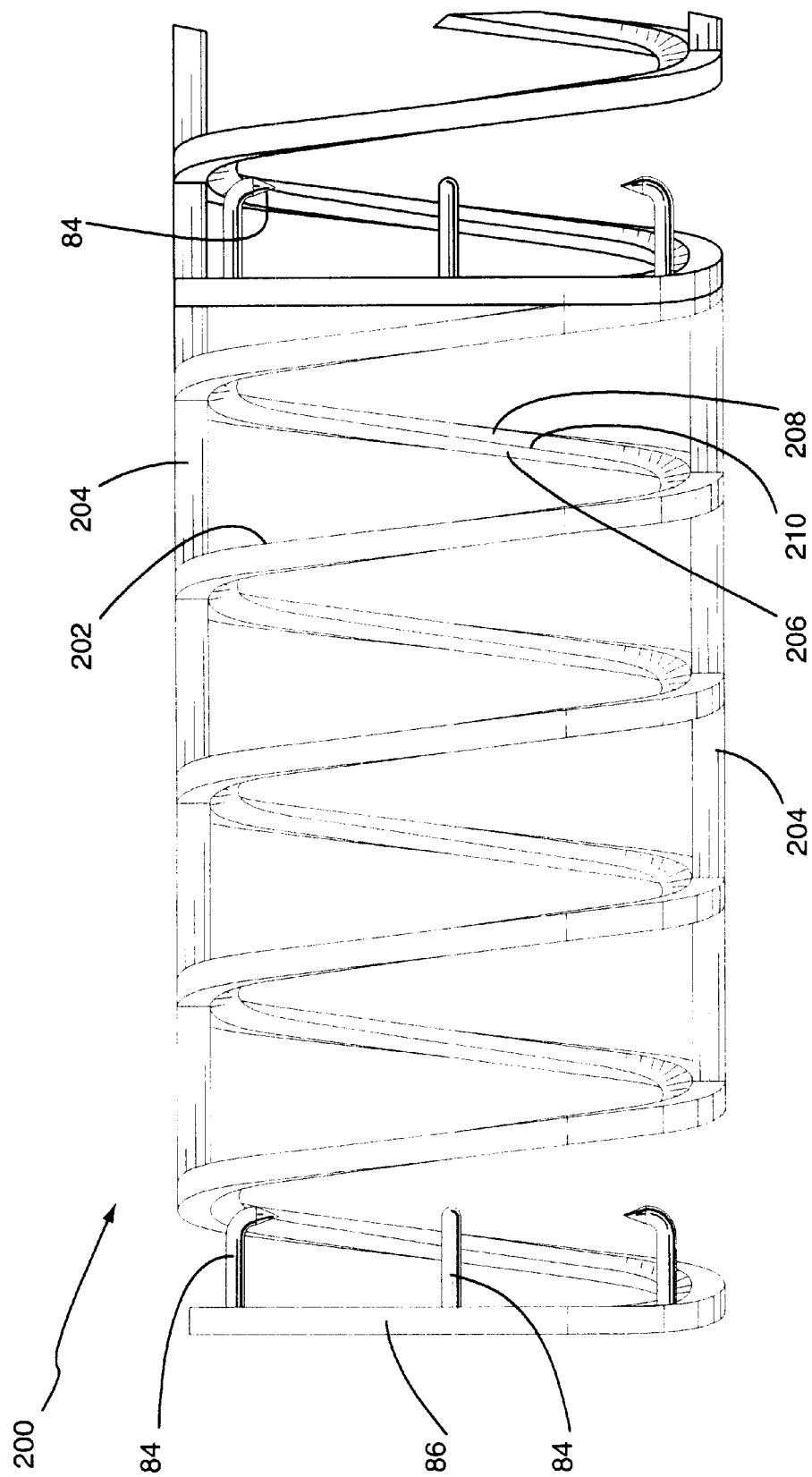
FIG. 9 is a side elevational view of a preferred embodiment of a baffle means which may be incorporated in the polarization device of FIGS. 5 to 8.

FIG. 9 illustrates a preferred embodiment of a baffle 200 which may replace baffles 82. In this arrangement, there is provided a spiral support portion 202 which is connected to longitudinally extending connecting members 204. It will be noted that spiral portion 202 is configured so as to have inwardly tapering side walls 206 and 208 to terminate in an edge 210. Edge 210 is spaced from the dielectric lining, as previously mentioned, by a distance of between 40 to 80 mm and preferably, between 50 and 70 mm.

As in the previously described embodiment, there are preferably provided supports 86 which extend about so as to form a wall and thereby slow passage of the fluid through passageway 88. On supports 86 there are provided electrode needles 84.

I claim:

1. An apparatus for treating a fluid, said apparatus comprising:

an outer elongated conduit connected to an electric ground;

an inner coaxial conduit, said inner coaxial conduit being of a metallic material having a dielectric material on an outer surface thereof;

a fluid passageway defined intermediate the outer elongated conduit and inner coaxial conduit;

a baffle means mounted in said fluid passageway and adapted to impart a spiral motion to fluid flowing therein;

a plurality of electrode needles in electrical communication with said outer conduit, said electrode needles extending inwardly towards said inner coaxial conduit; and a means for creating a field within said passageway comprising a DC power source operatively connected to said inner conduit to apply a high voltage thereto.

2. The apparatus of claim 1 wherein said means for creating a field. within said passageway further comprises a plurality of magnets mounted within said inner conduit, each of said magnets being placed such that adjacent magnets have like poles adjacent each other.

3. The apparatus of claim 2 further including separators between adjacent magnets.

4. The apparatus of claim 2 wherein said baffle means are arranged such that a fluid passing through said fluid passageway will circulate through 360 degrees in a distance equivalent to 1½ magnet lengths.

5. The apparatus of claim 2 wherein said magnets are AlNiCo magnets.

6. The apparatus of claim 2 wherein said magnets are located such that there is a north pole at an exit end of said fluid passageway.

7. The apparatus of claim 1 wherein said baffle means include a spirally configured member having an inwardly extending edge which has a tapered configuration.

8. The apparatus of claim 7 wherein said inner coaxial conduit has a diameter approximately 50% of a diameter of said outer elongated conduit.

9. The apparatus of claim 1 wherein said dielectric material is PTFE.

* * * * *